US012480364B2

(12) United States Patent
Viitaniemi et al.

(10) Patent No.: US 12,480,364 B2
(45) Date of Patent: Nov. 25, 2025

(54) ARRANGEMENT AND METHOD FOR HEATING HYDRAULIC IMPACT DEVICE

(71) Applicant: SANDVIK MINING AND CONSTRUCTION OY, Tampere (FI)

(72) Inventors: Jarno Viitaniemi, Tampere (FI); Pertti Parkkinen, Tampere (FI); Martti Leskinen, Tampere (FI); Mikko Hamalainen, Tampere (FI); Perttu Koivumaki, Tampere (FI); Timo Kela, Tampere (FI); Ville Kohola, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 147 days.

(21) Appl. No.: 18/436,243

(22) Filed: Feb. 8, 2024

(65) Prior Publication Data

US 2024/0271488 A1 Aug. 15, 2024

(51) Int. Cl.
*E21B 7/02* (2006.01)
*E02F 9/22* (2006.01)
(Continued)

(52) U.S. Cl.
CPC ................ *E21B 7/022* (2013.01); *E02F 9/22* (2013.01); *E21B 1/26* (2020.05); *E21B 7/025* (2013.01); *E21B 44/02* (2013.01); *F15B 15/1485* (2013.01); *F15B 21/0427* (2019.01); *B25D 9/12* (2013.01); *E02F 9/2292* (2013.01); *E21B 44/06* (2013.01)

(58) Field of Classification Search
CPC ....... E02F 1/00; E02F 3/96; E02F 9/22; E02F 9/2239; E02F 9/2292; E02F 9/2217; E02F 9/2296; E21B 1/0021; E21B 1/26; E21B 3/025; E21B 4/14; E21B 7/022; E21B 7/025; E21B 41/0021; E21B 44/02; E21B 44/04; E21B 44/06; B25D 9/12
USPC ................. 173/1, 2, 8, 11, 206; 175/27, 122
See application file for complete search history.

(56) References Cited

U.S. PATENT DOCUMENTS 5,778,990 A * 7/1998 Niemi ..................... E21B 44/06 175/122
9,033,065 B2 * 5/2015 Viitaniemi .............. E21B 44/02 175/27

(Continued)

FOREIGN PATENT DOCUMENTS

EP 2045492 A2 4/2009
EP 4043153 A1 8/2022

(Continued)

*Primary Examiner* — Scott A Smith
(74) *Attorney, Agent, or Firm* — Corinne R. Gorski

(57) ABSTRACT

An arrangement and method for heating an impact device of a rock treating machine (Rtm) in low-temperature operating conditions is provided. The arrangement includes a warm-up mode (WM) for feeding pre-heated hydraulic fluid through a feed channel to a hydraulic circuit of the impact device. One or more hydraulic accumulators are provided in the hydraulic circuit. The feed channel is provided with a control element for limiting the feeding of the pre-heated hydraulic fluid during the warm-up mode. The control element limits the feeding of the pre-heated hydraulic fluid in the feed channel so that separating elements of the pressure accumulators do not move.

9 Claims, 3 Drawing Sheets

(51) Int. Cl.

| | |
|---|---|
| ***E21B 1/26*** | (2006.01) |
| ***E21B 44/02*** | (2006.01) |
| ***F15B 15/14*** | (2006.01) |
| ***F15B 21/0427*** | (2019.01) |
| *B25D 9/12* | (2006.01) |
| *E21B 44/06* | (2006.01) |

(56) References Cited

U.S. PATENT DOCUMENTS

| | | | | |
|---|---|---|---|---|
| 10,151,191 | B2 * | 12/2018 | Viitaniemi | E21B 7/025 |
| 12,018,563 | B2 * | 6/2024 | Uotila | E21B 7/025 |
| 12,264,583 | B2 * | 4/2025 | Rantanen | E21B 7/022 |
| 2017/0074086 | A1 * | 3/2017 | Viitaniemi | E21B 41/0021 |
| 2019/0277311 | A1 * | 9/2019 | Verho | E02F 9/2292 |
| 2024/0271488 | A1 * | 8/2024 | Viitaniemi | F15B 21/0427 |

FOREIGN PATENT DOCUMENTS

| | | | |
|---|---|---|---|
| JP | S62017407 | A | 1/1987 |
| JP | 2020159465 | A | 10/2020 |

* cited by examiner

ARRANGEMENT AND METHOD FOR HEATING HYDRAULIC IMPACT DEVICE

RELATED APPLICATION DATA

This application claims priority under 35 U.S.C. § 119 to EP Patent Application No. 23156038.4, filed on Feb. 10, 2023, which the entirety thereof is incorporated herein by reference.

FIELD OF THE INVENTION

The present disclosure relates to an arrangement for heating a hydraulic impact device of a rock treating machine in low-temperature operating conditions, a rock drilling machine, and a method of heating a hydraulic impact device of a rock treating machine.

BACKGROUND

In mines and at other work sites different type of rock drilling rigs provided with rock drilling machines are used for drilling drill holes to rock surfaces. Also, other work machines, such as excavators provided with hydraulic rock breakers are used for breaking rock. The rock drilling machines and the rock breakers are typically provided with hydraulic impact devices connected to hydraulic systems of the basic machines. In many cases these machines need to be operable at low-temperature operating conditions, at least during the winter months. Cold temperatures have an effect on the viscosity of hydraulic fluids in the hydraulic system, and also on elastomeric materials like sealings and pressure separating elements in pressure accumulators. Therefore, different kind of arrangements have been designed to pre-heat the hydraulic fluid and the system before initiating normal operation. However, the known solutions have shown some disadvantages.

SUMMARY

An object of the present disclosure is to provide an arrangement for heating an impact device, a rock drilling rig provided with such heating arrangement, and a method for heating an impact device.

An idea of the disclosed solution is that a hydraulic impact device of a rock treating machine is pre-heated with a heating arrangement for use in low-temperature operating conditions. The arrangement is provided with a selectively executable warm-up mode for feeding pre-heated hydraulic fluid through at least one feed channel to a hydraulic circuit of the impact device. The hydraulic circuit is connected to one or more pressure accumulators provided with pre-charge pressures. The mentioned feed channel is provided with at least one control element for limiting the feeding of the pre-heated hydraulic fluid in response to the selected warm-up mode. The control element limits the feeding of the pre-heated hydraulic fluid in the feed channel so that pressure is below a first pre-charge pressure of a first pressure accumulator, which is located first in downstream of the fed flow.

In other words, limited and gentle hydraulic power is submitted to the impact device for executing the warm-up. The solution is intended for preventing compression and volume change in a gas space of the pre-charged pressure accumulator during the warm-up. The gas space is filled with gas and a membrane, piston, or other separating element, separates the gas space from a fluid space of the pressure accumulator. Since the hydraulic fluid is fed during the warm-up with a pressure lower than the pre-charge pressure, movement of the separating element can be avoided. This target is based on the fact that the pre-heated hydraulic fluid fed to the hydraulic circuit of the impact device during the warm-up cannot compress the gas inside the gas space.

An advantage of this solution is that movements of the membranes of the pressure accumulators can be avoided during the warm-up, whereby no harmful stresses is directed to the membranes, which are at low temperature. This way breakages of the membranes can be avoided, and the operating life of the membranes can be longer. Thus, maintenance expenses and down time of the rock drilling machine can be decreased. A further advantage is that the solution may allow use of membrane materials, which have reduced or poor durability at low temperatures, such as nitrile rubber (NBR). It is a generally known fact that brittleness of elastomer materials increases at low temperatures.

In piston type accumulators the disclosed solution may prevent damage of piston seals.

The executed warm-up mode is also gentle for other components, such as sealings, being part of or connected to the hydraulic circuit of the impact device since reduced hydraulic power is implemented during the warm-up.

A further advantage is that, when the fed hydraulic power is limited during the warm-up mode, it is possible to decrease stresses and wear subjected to sealings of an impact device. The impact device operates at low frequency during the warm-up mode whereby sliding speed of the sealings remain low. Also, pressures affecting the sealings are low and constant, which have a positive impact to durability of the sealings.

According to an embodiment, the at least one control element is configured to limit flow, or pressure, or flow and pressure of the fed pre-heated hydraulic fluid during the warm-up mode. In other words, hydraulic power fed during the warm-up is controlled so that the hydraulic pressure remains at the first pressure accumulator, below its pre-charge pressure.

According to an embodiment, the rock treating machine is a rock drilling machine for drilling drill holes on a rock surface. The rock drilling machine includes a hydraulic impact device for directing impact pulses to a drilling tool. Typically, there is also a rotating device for rotating the drilling tool.

According to an embodiment, the disclosed solution may also be implemented in hydraulic rock breaking machines intended for breaking rock in mines and construction work sites. The hydraulic rock breaking machine includes an impact device and there are also hydraulic accumulators, which need to be protected when starting percussion operations in low ambient temperatures. Thus, in this embodiment the rock treating machine is a hydraulic rock breaking machine known also as a hydraulic breaker and a hydraulic breaking hammer.

According to an embodiment, the control element is configured to limit the flow of the fed hydraulic fluid so that frequency of the impact device is in the warm-up less than 10% of frequency of normal operation mode. For example, the frequency of percussion mechanism can be limited to be 1 Hz in an impact device wherein normal operating frequency is 30 Hz.

According to an embodiment, the arrangement includes at least one pressure sensor for sensing pressure prevailing at a gas space of at least one pressure accumulator. This way it may be possible to control feeding of the hydraulic fluid during the warm-up mode in response to the pressure sensing data. A control system may monitor the pressure of the gas space and notice if the pressure therein increases which indicates the volume limited by the separating element decreases. This way movement of the separating element can be detected. A control system controlling the feeding of the pre-heated hydraulic fluid can be provided with a monitoring program and predetermined pressure limits for executing the monitoring.

According to an embodiment, the arrangement includes a dedicated control element for executing the limitation for the feed flow during the warm-up mode. The control element is a separate component in relation to a control valve controlling feeding of hydraulic fluid to the impact device during normal operation.

In a further embodiment, the normal control valve is controlled to execute the disclosed limitation during the warm-up mode and is used in normal operational mode without this limiting feature.

According to an embodiment, the arrangement includes a dedicated warm-up feed channel or circuit for the feeding of the pre-heated hydraulic fluid during the warm-up. The control element limiting the feeding is then located on the warm-up feed channel. The fluid feed through the warm-up feed channel can be selected for the duration of the warm-up and when the heating is completed, normal unlimited feeding is executed via a normal feed channel.

According to an embodiment, the control element limiting the feeding is alternatively located in connection with a normal feed channel of the impact device i.e., the feed channel which is used during the normal drilling mode to supply the needed hydraulic fluid. In this solution, the control element is selectively connectable operable for limiting the flow, and correspondingly connectable inoperable for not influencing to the flow:

According to an embodiment, the first pressure accumulator is a high-pressure accumulator for storing pressurized hydraulic fluid for executing movement of a percussion piston of the impact device in impact direction. The hydraulic circuit further includes a second pressure accumulator such as a low-pressure accumulator provided with second pre-charge pressure, which is lower than the first pre-charge pressure. Accordingly, the control element is configured to control the feeding of the pre-heated hydraulic fluid so that pressure at a first fluid space of the first pressure accumulator is lower than the first pre-charge pressure, and that pressure at a second fluid space of the second pressure accumulator is lower than the second pre-charge pressure. In other words, the impact device includes several pressure accumulators each of them having a gas space and a fluid space. The high-pressure accumulator is a pressure accumulator first receiving the fed fluid flow, and the low-pressure accumulator is a last pressure accumulator wherefrom the hydraulic fluid is finally discharged from the hydraulic circuit of the impact device. An advantage of this solution is that the pressure of the fed pre-heated hydraulic fluid can be limited so that membranes or other separating elements of the high-pressure or low-pressure accumulators do not move during the warm-up mode.

According to an embodiment, the pressure at the second fluid space of the low-pressure accumulator is lower than the pressure at the first fluid space of the high-pressure accumulator because of internal flow resistance inside the impact device and because hydraulic power is used for generating percussion movements of the percussion piston.

According to an embodiment, the first pre-charge pressure of the first pressure accumulator, i.e., the high-pressure accumulator is typically 50-70 bar, depending on performance and structure of the impact device, whereas the second pre-charge pressure of the second pressure accumulator, i.e., the low-pressure accumulator is typically 1-7 bar.

According to an embodiment, the hydraulic circuit of the impact device includes a third pressure accumulator which is configured to receive the fed pre-heated hydraulic fluid after the high-pressure accumulator and parallel with the low-pressure accumulator. Thereby, when examining the several pressure accumulators in the direction of flow; the order is the first pressure accumulator, and then simultaneously the third pressure accumulator and the second pressure accumulator. The third pressure accumulator may be a damper or stabilator pressure accumulator and is provided with a third pre-charge pressure at its gas space. Thus, the control element is configured to control the feeding of the pre-heated hydraulic fluid so that pressure at a third fluid space of the third pressure accumulator is below the third pre-charge pressure. Stated otherwise, the pressures at fluid spaces of each of the several pressure accumulators can be set during the warm-up lower than the pre-charge pressures of the corresponding several pressure accumulators. Accordingly, the purpose may be that all the separating elements of the several pressure accumulators remain immovable during the warm-up.

According to an embodiment, the control element is a throttle. In other words, the feed flow of the pre-heated hydraulic fluid is throttled for decreasing fluid flow through the control element to the impact device during the warm-up mode.

According to an embodiment, the throttle is provided with a fixed orifice.

According to an embodiment, the throttle is provided with a fixed orifice and a diameter of the orifice is 0.7-1.0 mm. A diameter of 0.8 mm was found suitable in one test arrangement.

According to an embodiment, the control element includes at least two throttles in series. Thus, there may be, for example, two throttles with a 1.0 mm diameter.

According to an embodiment, the throttle is adjustable, whereby the size of the orifice of the throttle can be changed. The size of the orifice may be adjustable manually or remotely.

According to an embodiment, the throttling of the fed hydraulic fluid may generate heat in the fluid and this phenomenon can be utilized in the warm-up.

According to an embodiment, the control element is a proportional valve with an adjustable opening for throttling the fed pre-heated hydraulic fluid. In other words, this embodiment utilizes the proportional valve, which is a valve capable of controlling passing fluid flow by varying the size of the opening or flow passage.

According to an embodiment, the proportional valve may be controlled under control of a control unit belonging to the arrangement and controlling the warm-up mode.

According to an embodiment, it is also possible to use other types of adjustable valves, which are capable of throttling or limiting the hydraulic power supplied to the impact device during the warm-up.

According to an embodiment, the arrangement includes at least one temperature controller, or thermostat for controlling execution of the normal operation mode. When the fluid temperature is high enough, the temperature controller can open and only then allow generation of greater impacts. Thus, the solution may include one or more mechanic-hydraulic temperature detectors implemented for providing temperature data for controlling the warm-up mode.

According to an embodiment, the arrangement includes at least one control unit for at least initiating and terminating execution of the warm-up mode. In other words, the control unit is configured to control duration of the warm-up automatically. The control unit can select the operation of the arrangement between the warm-up mode and a normal drilling mode.

According to an embodiment, the control unit may have a control program, algorithm, or sequence for controlling the operation of the warm-up mode and being executable in a processor of the control unit.

According to an embodiment, the control element is an adjustable element, and the control unit is configured to adjust the size of an orifice of the control element for adjusting magnitude of a limitation caused by the fed flow.

According to an embodiment, the arrangement includes at least one control unit and also one or more temperature sensors for providing temperature data. Then the warm-up mode is controlled in response to the temperature data. In other words, the control unit may control start and stop of execution of the warm-up mode as well as magnitude of the warm-up in response to the gathered temperature data.

According to an embodiment, the arrangement includes at least one temperature sensor for determining ambient temperature.

According to an embodiment, the arrangement includes at least one temperature sensor for determining temperature of the rock drilling machine or one of its actuators or components.

According to an embodiment, the arrangement includes at least one temperature sensor for determining temperature of the hydraulic fluid fed to impact device.

According to an embodiment, the disclosed solution relates also to a rock drilling rig. The rock drilling rig includes: a movable carrier: one or more drilling booms mounted movably relative to the carrier: at least one drilling unit mounted to the drilling boom and comprising a feed beam: a rock drilling machine mounted on the feed beam and comprising an impact device; and an arrangement for heating the impact device in low-temperature operating conditions. The arrangement for providing the heating is in accordance with the features and embodiments disclosed in this document.

According to an embodiment, the disclosed solution relates also to a method of heating an impact device of a rock treating machine in low-temperature operating conditions. The method includes: conducting pre-heated hydraulic fluid selectively to a hydraulic circuit of the impact device for providing the rock treating machine with a warm-up mode and executing the warm-up mode before initiating a normal operational mode; and conducting the pre-heated hydraulic fluid in a hydraulic circuit of the impact device via at least one pressure accumulator provided with pre-charge pressure. The method further includes conducting the pre-heated hydraulic fluid through at least one control element to the hydraulic circuit of the impact device during the warm-up mode; and limiting feeding of the pre-heated hydraulic fluid to the impact device by means of the control element for reducing pressure at a first pressure accumulator below a first pre-charge pressure of the first pressure accumulator which is first of the at least one pressure accumulator receiving the pre-heated hydraulic fluid in downstream. In other words, magnitude of the feeding of the pre-heated hydraulic fluid is set so low that gas spaces inside the one or more pressure accumulators are not compressed and membranes, or corresponding separating elements, between the gas spaces and fluid spaces of the one or more pressure accumulators do not move during the warm-up mode.

According to an embodiment, the method includes limiting properties of the conducted pre-heated hydraulic fluid by means of the control element so that impact cycle of the impact device operates with reduced operational frequency during the warm-up mode. Since the impact device is operating with reduced capacity during the warm-up mode, the pre-heated hydraulic fluid flows through the impact device and the through flowing pre-heated hydraulic fluid can effectively heat the impact device and its components, especially pressure accumulators. Thus, the flow of the pre-heated hydraulic fluid intensifies transfer of heat, and still, the warm-up is gentle because the impact device and its components operate with strongly reduced hydraulic power. The heating may be more effective compared to a situation wherein the impact mechanism is not moving at all.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

For the sake of clarity, the figures show some embodiments of the disclosed solution in a simplified manner. In the figures, like reference numerals identify like elements.

DETAILED DESCRIPTION

Figure 1:
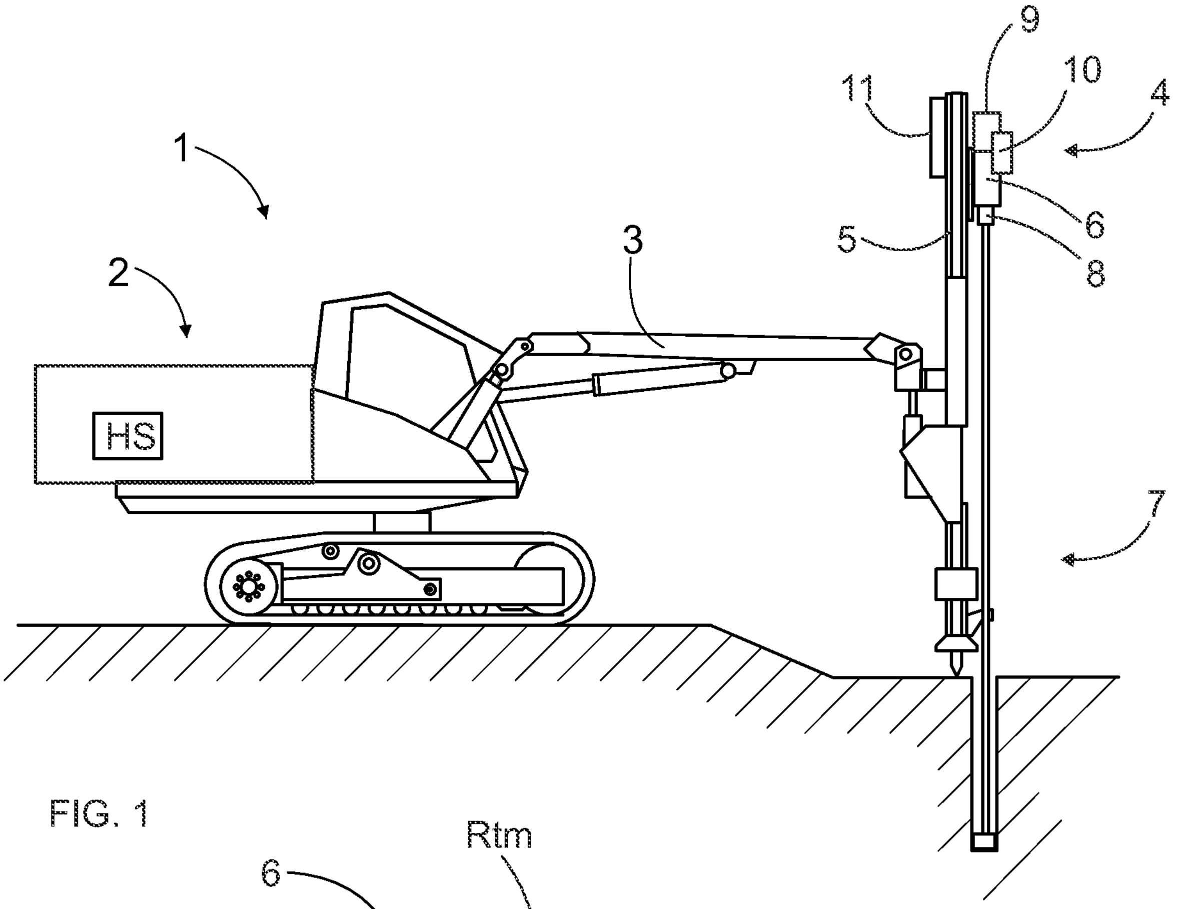
FIG. 1 is a schematic side view of a rock drilling rig.

FIG. 1 shows a rock drilling rig 1 intended for surface drilling. The rock drilling rig 1 includes a movable carrier 2 and at least one drilling boom 3 connected to the carrier 2. At a distal end portion of the drilling boom 3 is a drilling unit 4 provided with a feed beam 5 and a rock drilling machine 6 supported on it. A drilling tool 7 is connectable to the drilling machine 6. The rock drilling machine 6 may include a shank adaptor 8 at a front end of the rock drilling machine 6 for connecting the tool 7. The rock drilling machine 6 includes an impact device 9 and a rotating device 10. The rock drilling machine 6 may be moved on the feed beam 5 by means of a feed device 11. The rock drilling machine 6 is hydraulically operated and is connected to a hydraulic system HS. When initiating operation at cold temperatures, hydraulic fluid of the hydraulic system HS and the hydraulic rock drilling machine 6 needs to be pre-heated before the actual drilling process can be started. If not properly pre-heated, risk of damages to components of the impact device 9 occurs. Thus, the disclosed rock drilling rig 1 may be provided with the disclosed pre-heating arrangement.

Figure 2:
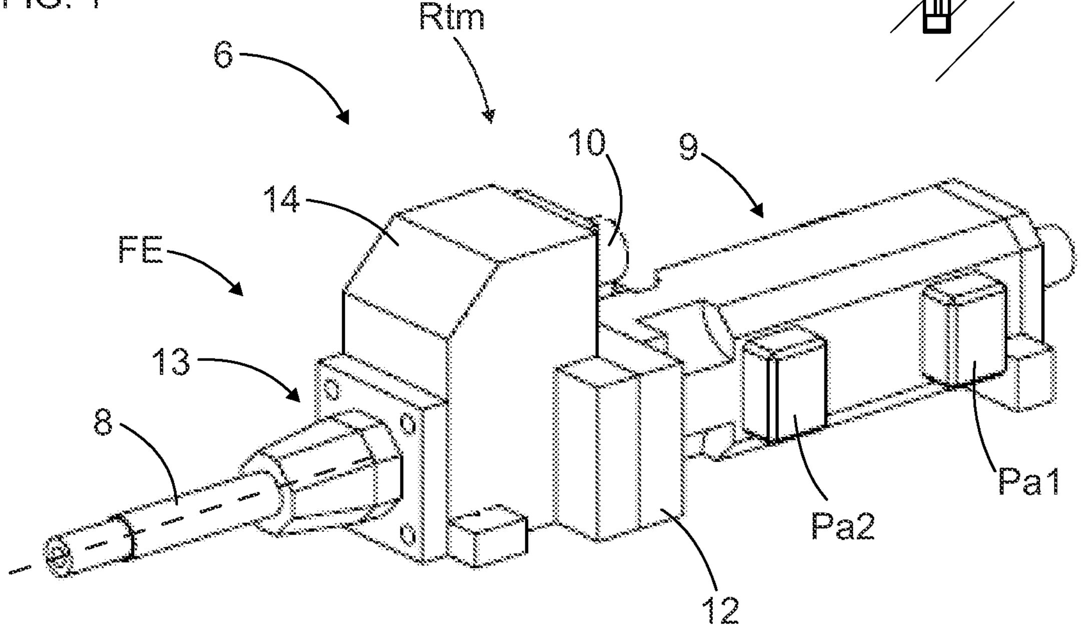
FIG. 2 is a schematic view of a hydraulic rock drilling machine.

FIG. 2 illustrates a rock drilling machine 6, which is one type of rock treating machine Rtm. The rock drilling machine includes a body 12, an impact device 9, a rotating device 10, a flushing housing 13, a shank adaptor 8, a gear housing 14 mounted at a front end of the body 12. The impact device 9 includes an impact piston for generating impact pulses to the shank adapter 8. The piston moves in a reciprocating manner in the impact direction and return direction.

FIG. 2 also shows a first pressure accumulator Pa1 and a second pressure accumulator Pa2, which are part of the hydraulic circuit of the impact device 9. The first pressure accumulator Pa1 may be a high pressure accumulator and the second pressure accumulator Pa2 may be a low pressure accumulator. The pressure accumulators Pa1 and Pa2 store and release pressurized hydraulic in accordance with the movements of the impact piston.

Figure 3:
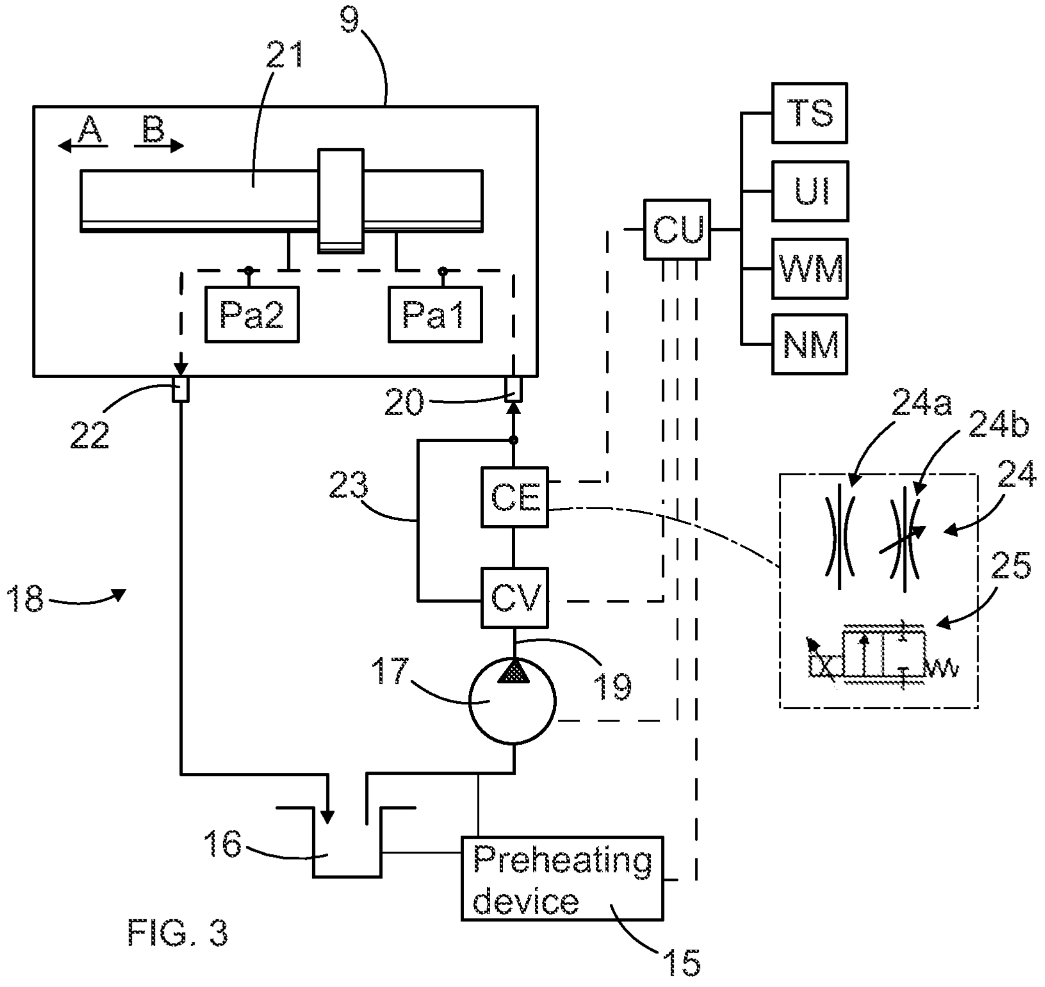
FIG. 3 is a schematic view of an arrangement for pre-heating an impact device.

FIG. 3 discloses by means of a simplified hydraulic diagram an arrangement wherein preheated hydraulic fluid can be circulated through an impact device 9 in a gentle limited manner when a warm-up mode WM is activated in a control unit CU. The hydraulic fluid can be preheated by means of a preheating device 15 which may include heating means arranged in connection with a tank 16, or alternatively the preheating device 15 may circulate the hydraulic fluid through a hydraulic throttle for heating it. The preheating device 15 may be controlled by means of the control unit CU. A hydraulic pump 17 pumps the hydraulic fluid to flow in a hydraulic circuit 18 through the impact device 9 and back to the tank 16. During the warm-up mode WM, the hydraulic fluid is conveyed via a feed channel 19 and by means of a control valve CV through a control element CE to a feed port 20 of the impact device 9. The control element CE limits feeding of the preheated hydraulic fluid so that percussion piston 21 executes it reciprocating movement at lower impact rate and pressures at a first pressure accumulator Pa1 and a second pressure accumulator Pa2 remain lower than their pre-charge pressures. The preheated hydraulic fluid flows inside the impact device 9 gently and does not overstress the structures being at low temperatures. The preheated hydraulic fluid passes hydraulic channels inside the impact device 9 and allow the heat of the preheated fluid to spread effectively therein. Finally, the hydraulic fluid flow is discharged through an outlet port 22. When a normal mode NM is connected, the preheating is terminated and the control valve CV directs the fluid flow through a channel 23 that passes the control element CE. In the normal mode NM, the fluid flow is not limited whereby the impact device 9 can operate at its designed impact rate and pressure accumulators Pa1 and Pa2 can receive greater pressures inside their fluid spaces. The first pressure accumulator Pa1 can assist movement of the percussion piston 21 in impact direction A and the second pressure accumulator Pa2 can assist movement in return direction B.

Hydraulic connections of the control valve CV, the channel 23, and the control element CE can of course differ from the exemplary solution shown in FIG. 3.

The control unit CU may be provided with a processor for executing one or more control programs including control principles for controlling at least the control element CE, control valve CV, and the preheating device 15. The control unit CU may be arranged to automatically control the disclosed arrangement, or alternatively in assistance with an operator. There may be a user interface UI for communication between the control unit CU and the operator. The control unit CU may receive temperature data from one or more temperature sensors TS. There may be one or more temperature sensors TS for sensing ambient temperatures, hydraulic fluid temperatures, and component temperatures. The temperature data received by the control unit CU can be taken into consideration when controlling the operation mode between the normal mode NM and the warm-up mode WM.

The control unit CU may also be configured to control operation of the hydraulic pump 17. The control unit CU may provide the hydraulic pump 17 with a lower fluid flow and pressure request during the warm-up mode WM. The hydraulic pump 17 may be provided with adjustable displacement capacity, for example.

FIG. 3 further discloses some embodiments of the control element CE mountable to the feed channel 19. The control element CE may be a throttle 24, either with a fixed orifice 24*a* or with an adjustable orifice 24*b*. Alternatively, the control element CE may be a proportional valve 25 with adjustable opening for throttling the fed pre-heated hydraulic fluid. The proportional valve 25 may be electrically controlled under control of the control unit CU.

In the simplified hydraulic diagram of FIG. 3, no control valve is disclosed controlling operating cycle of the percussion piston 21 of the impact device 9. The control valve may be a sleeve structure surrounding the percussion piston 21, for example.

Figure 4:
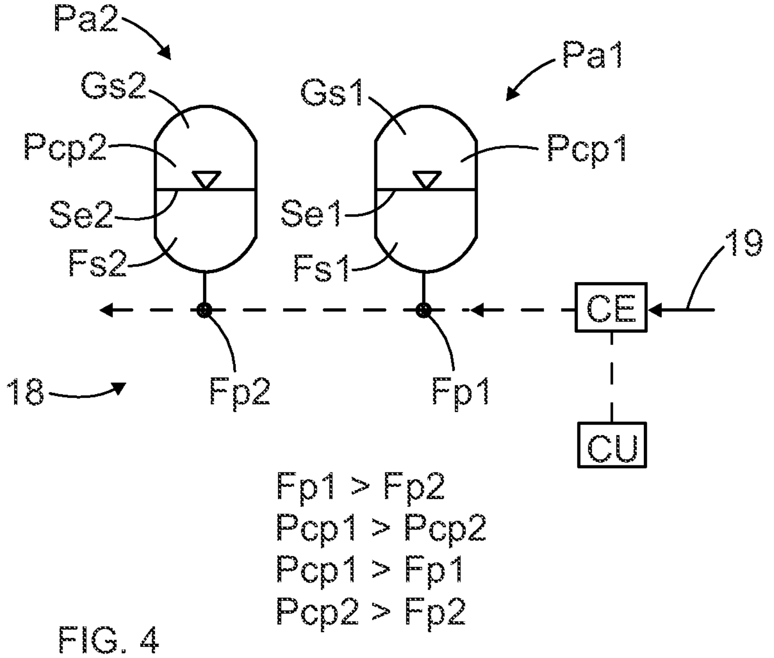
FIG. 4 is a schematic view of pressure accumulators connected to a hydraulic circuit of an impact device.

FIG. 4 discloses two successive hydraulic actuators Pa1 and Pa2 arranged to a hydraulic circuit 18 of an impact device. A feed channel 19 is provided with a control element CE for limiting flow, pressure, or flow and pressure, of the fed pre-heated hydraulic fluid during a warm-up mode. The control element limits the feeding so that hydraulic fluid pressure Fp1 at a first pressure accumulator Pa1 is below first pre-charge pressure Pcp1 at a gas space GS of a first pressure accumulator Pa1 which is located first in downstream of the fed flow. The pressure Fp1 prevails in a fluid space Fs1 of the first pressure accumulator Pa1. At a second pressure accumulator Pa2 hydraulic fluid pressure Fp2 is lower since the hydraulic fluid flows through the impact device and hydraulic energy is utilized for making reciprocating movement of a percussion piston. The first pressure accumulator Pa1 is a high-pressure accumulator for storing pressurized hydraulic fluid for executing movement of the percussion piston in impact direction and the second pressure accumulator Pa2 is a low-pressure accumulator provided with second pre-charge pressure Pcp2, which is lower than the first pre-charge pressure Pcp1. The control element CE is configured to control the feeding of the pre-heated hydraulic fluid also so that hydraulic fluid pressure Fp2 at a second fluid space Fs2 of the second pressure accumulator Pa2 is lower than the second pre-charge pressure Pcp2. Thus, the pressures Fp1 and Fp2 do not cause movements to separating elements Se1 and Se2 whereby gentle heating can be provided for the pressure accumulators Pa1, Pa2.

In some hydraulic circuits of impact devices, there may be only one pressure accumulator, or there may be three or even more pressure accumulators. However, the same principles for the feeding of the pre-heated hydraulic fluid applies then too.

Figure 5:
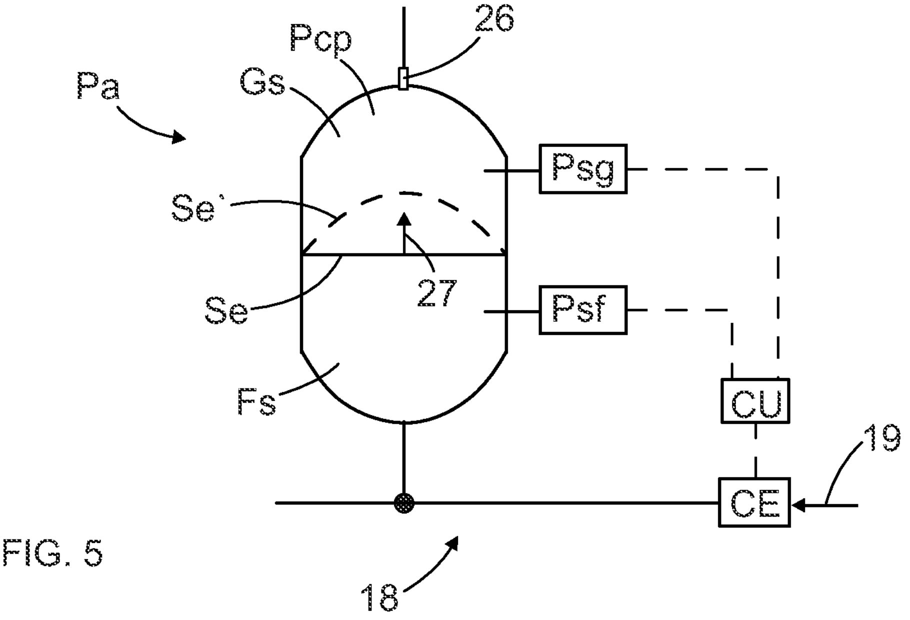
FIG. 5 is a schematic view of a pressure accumulator and movement of a separating element due to pressure difference in its pressure spaces.

FIG. 5 discloses a pressure accumulator Pa connected to a hydraulic circuit 18, wherein pre-heated hydraulic fluid is fed through a control element CE controlled by a control unit CU. Pre-charge pressure can be set to a gas space Gs through a gas port 26. A separating element Se, such a membrane, can move 27 from a fluid space Fs towards the gas space Gs when pressure inside the fluid space Fs is greater than pressure inside the gas space Gs. This movement 27 of the separating element Se can be detected by sensing pressure Psg inside the gas space Gs. When the pressure increases in the gas space Gs, it means that the separating element Se' has been moved. Pressure Psf prevailing inside the fluid space Fs can also be sensed. The control unit CU can take the gathered pressure data into account when controlling operation of the control element CE.

Figure 6:
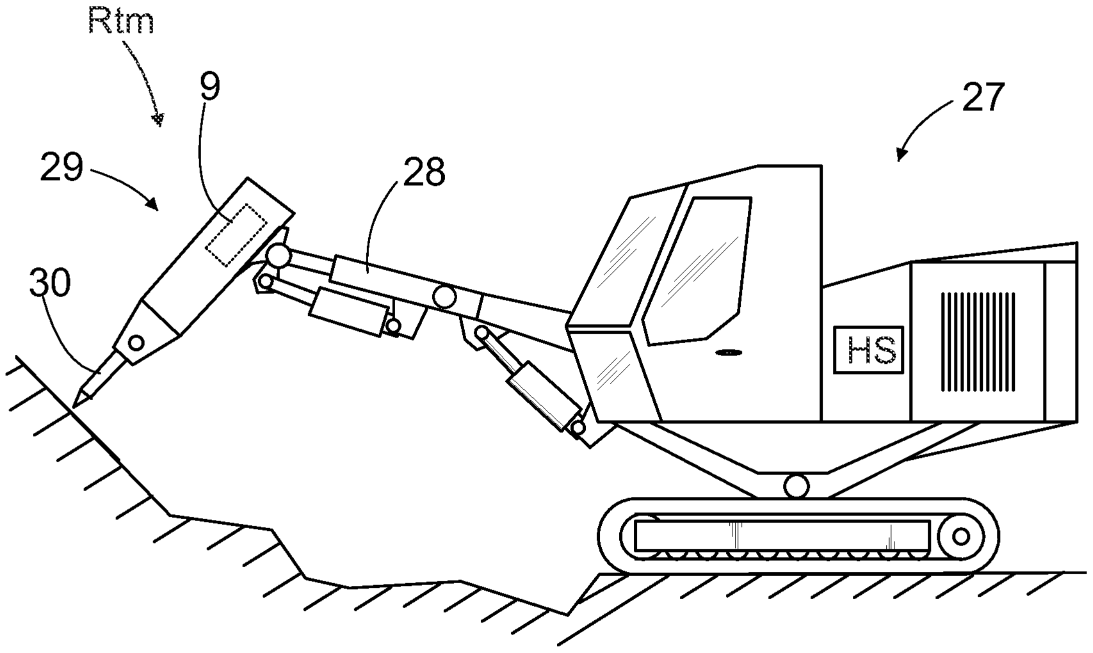
FIG. 6 is a schematic side view of a work machine provided with a hydraulic breaking hammer.

FIG. 6 discloses a mobile work machine 27 provided with a boom 28 and a hydraulic rock breaking hammer 29 mounted to the boom 28. The rock breaking hammer 29 is a rock treating machine Rtm, which includes an impact device 9 configured to provide impact pulses for a breaking tool 30 for breaking rock material. The impact device 9 is connected to a hydraulic system HS which is provided with the disclosed arrangement for pre-heating the impact device 9 when needed.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. An arrangement for heating a hydraulic impact device of a rock treating machine in low-temperature operating conditions, the arrangement comprising:

a selectively executable warm-up mode for feeding pre-heated hydraulic fluid through at least one feed channel to a hydraulic circuit of the impact device, wherein the hydraulic circuit of the impact device is connected to at least one pressure accumulator provided with pre-charge pressure, wherein the feed channel is provided with at least one control element for limiting the feeding of the pre-heated hydraulic fluid in response to the selected warm-up mode, and wherein the control element is configured to limit feeding of the pre-heated hydraulic fluid in the feed channel so that a pressure is below a first pre-charge pressure of a first pressure accumulator, which is located first downstream of a flow of the fluid being fed.

2. The arrangement as claimed in claim 1, wherein the first pressure accumulator is a high-pressure accumulator arranged for storing pressurized hydraulic fluid for executing movement of a percussion piston of the impact device in an impact direction, wherein the hydraulic circuit includes a second pressure accumulator being a low-pressure accumulator provided with a second pre-charge pressure, which is lower than the first pre-charge pressure, and wherein the control element is configured to control the feeding of the pre-heated hydraulic fluid so that pressure at a first fluid space of the first pressure accumulator is lower than the first pre-charge pressure, and that pressure at a second fluid space of the second pressure accumulator is lower than the second pre-charge pressure.

3. The arrangement as claimed in claim 1, wherein the control element is a throttle.

4. The arrangement as claimed in claim 1, wherein the control element is a proportional valve having an adjustable opening arranged for throttling the pre-heated hydraulic fluid being fed.

5. The arrangement as claimed in claim 1, further comprising at least one control unit arranged for at least initiating and terminating execution of the selected warm-up mode.

6. The arrangement as claimed in claim 1, further comprising:

at least one control unit; and at least one temperature sensor arranged for providing temperature data, wherein the selected warm-up mode is controlled in response to the temperature data.

7. A rock drilling rig comprising:

a movable carrier;

at least one drilling boom movably mounted to the carrier;

at least one drilling unit mounted to the at least one drilling boom and including a feed beam;

a rock drilling machine mounted on the feed beam (5) and including an impact device; and an arrangement in accordance with claim 1 arranged for heating the impact device in low-temperature operating conditions.

8. A method of heating an impact device of a rock treating machine in low-temperature operating conditions, the method comprising:

conducting pre-heated hydraulic fluid selectively to a hydraulic circuit of the impact device for providing the rock treating machine with a warm-up mode;

executing the warm-up mode before initiating a normal operational mode;

conducting the pre-heated hydraulic fluid in a hydraulic circuit of the impact device via at least one pressure accumulator provided with a pre-charge pressure;

conducting the pre-heated hydraulic fluid through at least one control element to the hydraulic circuit of the impact device during the warm-up mode; and limiting feeding of the pre-heated hydraulic fluid to the impact device by means of the control element for reducing pressure at a first pressure accumulator below a first pre-charge pressure of the first pressure accumulator, which is a first of the at least one pressure accumulator receiving the pre-heated hydraulic fluid in a downstream direction.

9. The method as claimed in claim 8, further comprising limiting properties of the conducted pre-heated hydraulic fluid by means of the control element so that an impact cycle of the impact device is operating with reduced operational frequency during the warm-up mode.

* * * * *